US010982552B2

(12) United States Patent
Moore et al.

(10) Patent No.: US 10,982,552 B2
(45) Date of Patent: Apr. 20, 2021

(54) GAS TURBINE ENGINE COMPONENT WITH FILM COOLING HOLE

(71) Applicant: United Technologies Corporation, Hartford, CT (US)

(72) Inventors: Sasha M. Moore, East Hartford, CT (US); Clifford J. Musto, West Hartford, CT (US); Timothy J. Jennings, South Windsor, CT (US); Thomas N. Slavens, Vernon, CT (US); San Quach, East Hartford, CT (US); Nicholas M LoRicco, Coventry, CT (US); John McBrien, South Glastonbury, CT (US); Carey Clum, East Hartford, CT (US); Christopher Whitfield, Manchester, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 1261 days.

(21) Appl. No.: 14/831,997

(22) Filed: Aug. 21, 2015

(65) Prior Publication Data
US 2016/0177738 A1 Jun. 23, 2016

Related U.S. Application Data

(60) Provisional application No. 62/047,263, filed on Sep. 8, 2014.

(51) Int. Cl.
*F01D 5/18* (2006.01)
*F01D 9/04* (2006.01)
(Continued)

(52) U.S. Cl.
CPC .............. *F01D 5/187* (2013.01); *F01D 5/186* (2013.01); *F01D 9/041* (2013.01); *F01D 11/08* (2013.01);
(Continued)

(58) Field of Classification Search
CPC .......... F01D 5/187; F01D 5/186; F01D 9/041; F01D 11/08; F01D 25/12; F02C 3/04;
(Continued)

(56) References Cited

U.S. PATENT DOCUMENTS

| 4,684,323 A |   | 8/1987 | Field |   |
|---|---|---|---|---|
| 4,762,464 A | * | 8/1988 | Vertz | B23H 9/10 |
|   |   |   |   | 219/69.1 |

(Continued)

FOREIGN PATENT DOCUMENTS

| EP | 2584148 | 5/2013 |
| GB | 2262314 | 6/1993 |

(Continued)

OTHER PUBLICATIONS

Extended European Search Report for European Application No. 15184019.6, dated Jan. 16, 2016.

*Primary Examiner* — Mary E McManmon
(74) *Attorney, Agent, or Firm* — Carlson, Gaskey & Olds, P.C.

(57) ABSTRACT

A gas turbine engine component includes a wall that provides an exterior surface and an interior flow path surface. The wall has a wall thickness. A protrusion is arranged on the wall that extends a height beyond the wall thickness and provides a portion of the interior flow path surface. A film cooling hole that has an inlet is provided on the protrusion and extends to an exit on the exterior surface.

20 Claims, 4 Drawing Sheets

(51) Int. Cl.
*F01D 11/08* (2006.01)
*F01D 25/12* (2006.01)
*F02C 3/04* (2006.01)
*F02C 7/18* (2006.01)
*F04D 29/32* (2006.01)
*F04D 29/54* (2006.01)
*F04D 29/58* (2006.01)

(52) U.S. Cl.
CPC ............... *F01D 25/12* (2013.01); *F02C 3/04* (2013.01); *F02C 7/18* (2013.01); *F04D 29/324* (2013.01); *F04D 29/542* (2013.01); *F04D 29/582* (2013.01); *F05D 2220/32* (2013.01); *F05D 2240/35* (2013.01); *F05D 2260/202* (2013.01); *Y02T 50/60* (2013.01)

(58) Field of Classification Search
CPC ........ F02C 7/18; F04D 29/324; F04D 29/542; F04D 29/582
USPC ........................................................ 415/115
See application file for complete search history.

(56) References Cited

U.S. PATENT DOCUMENTS

| | | | |
|---|---|---|---|
| 5,624,231 A * | 4/1997 | Ohtomo | .............. F01D 5/186 415/115 |
| 7,351,036 B2 | 4/2008 | Liang | |
| 7,866,950 B1 | 1/2011 | Wilson, Jr. | |
| 8,047,789 B1 | 11/2011 | Liang | |
| 8,057,183 B1 | 11/2011 | Liang | |
| 8,066,483 B1 | 11/2011 | Liang | |
| 8,092,176 B2 | 1/2012 | Liang | |
| 8,096,766 B1 | 1/2012 | Downs | |
| 8,109,726 B2 | 2/2012 | Liang | |
| 8,162,609 B1 | 4/2012 | Liang | |
| 8,317,475 B1 | 11/2012 | Downs | |
| 8,322,988 B1 | 12/2012 | Downs et al. | |
| 8,672,613 B2 * | 3/2014 | Bunker | .............. F01D 5/186 29/557 |
| 8,961,136 B1 * | 2/2015 | Liang | .............. F01D 5/187 415/115 |
| 2005/0042074 A1 | 2/2005 | Liang | |
| 2010/0003619 A1 | 1/2010 | Das et al. | |
| 2011/0158820 A1 | 6/2011 | Chamberlain et al. | |
| 2012/0087803 A1 | 4/2012 | Butler et al. | |
| 2013/0205791 A1 | 8/2013 | Mongillo, Jr. et al. | |
| 2013/0280093 A1 | 10/2013 | Zelesky et al. | |

FOREIGN PATENT DOCUMENTS

| | | | | |
|---|---|---|---|---|
| WO | 98/37310 | * | 8/1998 | ............... F01D 5/18 |
| WO | 9837310 | | 8/1998 | |
| WO | 9914465 | | 3/1999 | |

* cited by examiner

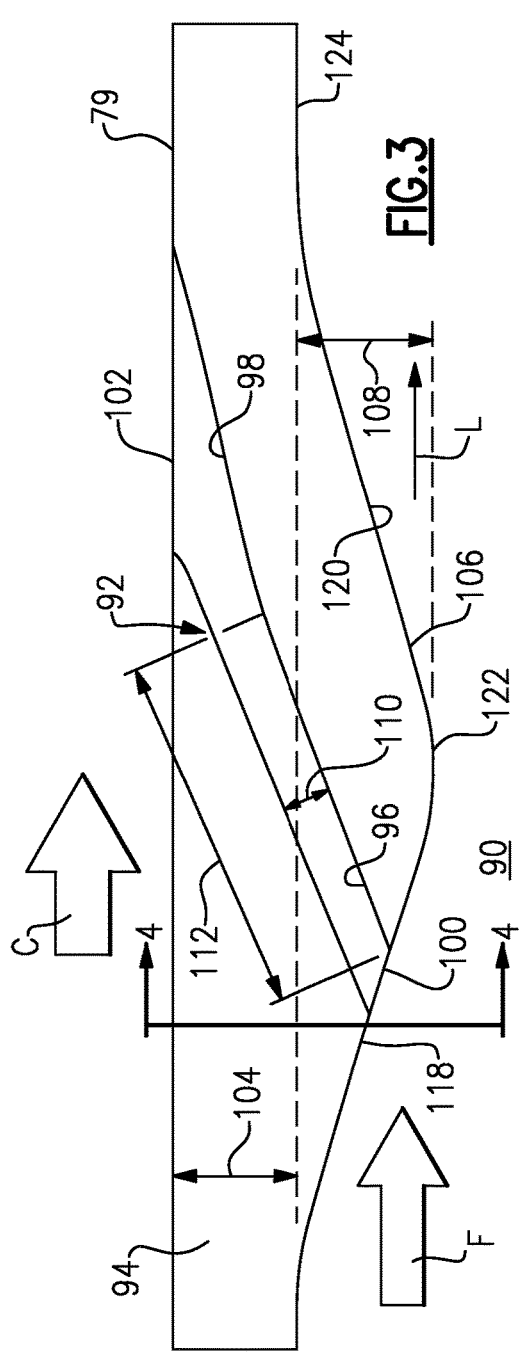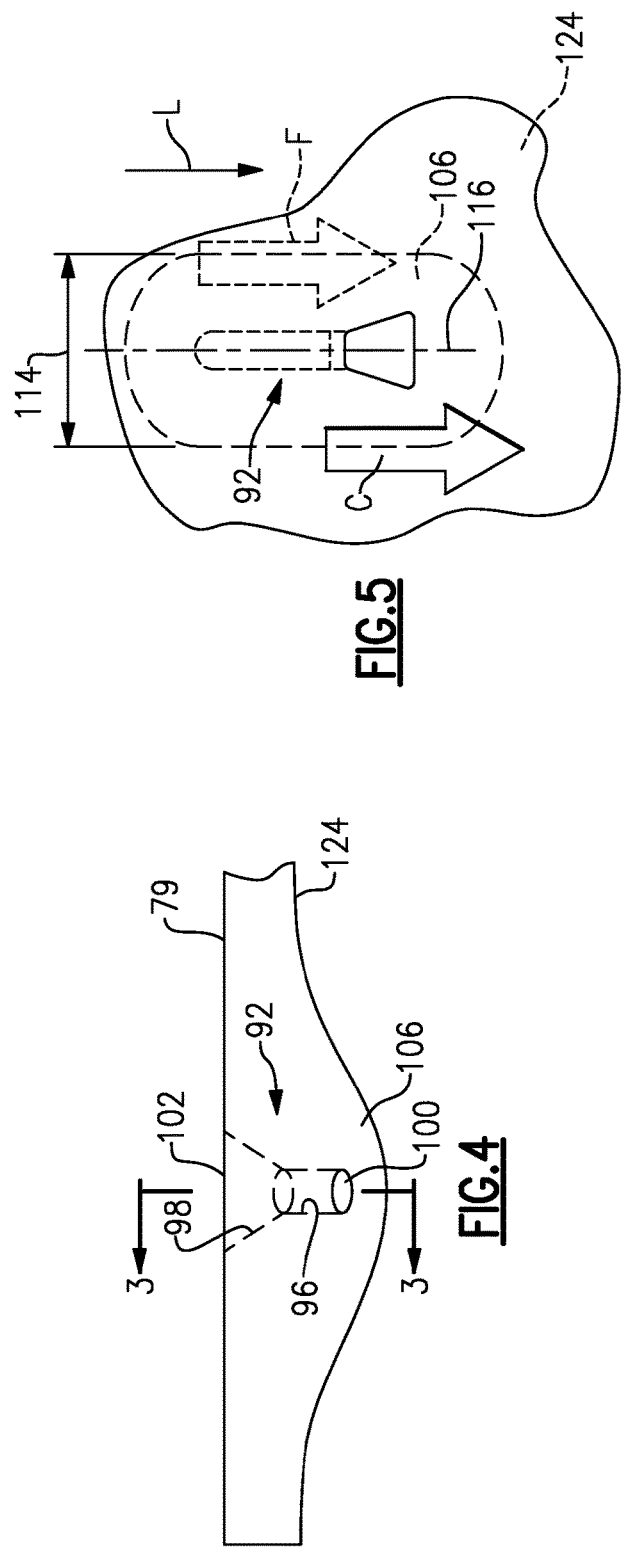

GAS TURBINE ENGINE COMPONENT WITH FILM COOLING HOLE

CROSS-REFERENCE TO RELATED APPLICATIONS

This application claims priority to U.S. Provisional Application No. 62/047,263, which was filed on Sep. 8, 2014 and is incorporated herein by reference.

BACKGROUND

This disclosure relates to a gas turbine engine component, such as a turbine airfoil. Particularly, the disclosure relates to a film cooling hole used to communicate fluid from an internal passageway to an exterior surface.

A gas turbine engine typically includes a fan section, a compressor section, a combustor section and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The advancement of turbomachinery performance is linked to both the over-all pressure ratio of the machine and the turbine inlet temperature that can be reliably sustained during service. Increases in efficiency through either of these methods typically produces a hotter operating environment for turbine flow path hardware in which the working fluid is typically several hundreds of degrees hotter than the melting point of the component alloys. Dedicated cooling air is extracted from the compressor and used to cool the gas path components in the turbine, which can incur significant cycle penalties.

For extremely high temperature applications, film cooling is typically utilized along with backside convection. This method uses cooling air delivered internal of the component and expelled through holes in the exterior airfoil surface to provide a cooling flow over the external surface that reduces the local external surface temperatures downstream. Typically cooling holes are machined into the part and are round or diffuser shaped as permitted by a typical laser or EDM machining process.

SUMMARY

In one exemplary embodiment, a gas turbine engine component includes a wall that provides an exterior surface and an interior flow path surface. The wall has a wall thickness. A protrusion is arranged on the wall that extends a height beyond the wall thickness and provides a portion of the interior flow path surface. A film cooling hole that has an inlet is provided on the protrusion and extends to an exit on the exterior surface.

In a further embodiment of the above, the gas turbine engine component is a turbine blade. The exterior surface is an exterior airfoil surface.

In a further embodiment of any of the above, the wall provides a cooling passage that extends in a longitudinal direction. The film cooling hole is aligned with the longitudinal direction.

In a further embodiment of any of the above, the film cooling holes includes a metering hole that provides the inlet and a diffuser that provides the exit arranged downstream from the metering hole.

In a further embodiment of any of the above, the metering hole defines a diameter and the height is in a range of 1.1-20 times the diameter.

In a further embodiment of any of the above, the metering hole extends a length in a range of 1.8-3.5 times the diameter.

In a further embodiment of any of the above, the metering hole includes a diameter in the range of 0.010-0.270 inch (0.25-6.86 mm).

In a further embodiment of any of the above, the protrusion includes a first tapered surface that is configured to face into a flow. The inlet is arranged on the first tapered surface.

In a further embodiment of any of the above, the protrusion includes a second tapered surface joining the first tapered surface at a peak. The second tapered surface is arranged on a downstream side of the protrusion.

In a further embodiment of any of the above, a centerline of the film cooling hole is angled from the longitudinal direction by an angle and aligned with a flow direction of the exterior surface.

In another exemplary embodiment, a gas turbine engine includes a compressor section, a turbine section and a component that is arranged in one of the compressor and turbine sections. The component includes a wall that provides an exterior surface and an interior flow path surface. The wall has a wall thickness. A protrusion is arranged on the wall and extends a height beyond the wall thickness and provides a portion of the interior flow path surface. A film cooling hole has an inlet provided on the protrusion and extends to an exit on the exterior surface.

In a further embodiment of the above, the component is arranged in the turbine section.

In a further embodiment of any of the above, the exterior surface is an exterior airfoil surface.

In a further embodiment of any of the above, the wall provides a cooling passage that extends in a longitudinal direction. The film cooling hole is aligned with the longitudinal direction.

In a further embodiment of any of the above, the film cooling holes includes a metering hole that provides the inlet and a diffuser provides the exit and is arranged downstream from the metering hole.

In a further embodiment of any of the above, the metering hole defines a diameter and the height is in a range of 1.1-20 times the diameter.

In a further embodiment of any of the above, the metering hole extends a length in a range of 1.8-3.5 times the diameter.

In a further embodiment of any of the above, the metering hole includes a diameter in the range of 0.010-0.270 inch (0.25-6.86 mm).

In a further embodiment of any of the above, the protrusion includes a first tapered surface that is configured to face into a flow. The inlet is arranged on the first tapered surface.

In a further embodiment of any of the above, the protrusion includes a second tapered surface that joins the first tapered surface at a peak. The second tapered surface is arranged on a downstream side of the protrusion.

BRIEF DESCRIPTION OF THE DRAWINGS

The disclosure can be further understood by reference to the following detailed description when considered in connection with the accompanying drawings wherein:

FIG. 3 is a cross-sectional view through a wall of a gas turbine engine component having the film cooling hole taken along line 3-3 in FIG. 4.

FIG. 4 is another cross-sectional view through the film cooling hole at its inlet take along line 4-4 in FIG. 3.

FIG. 5 is a plan view of an exterior surface of the gas turbine engine component.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
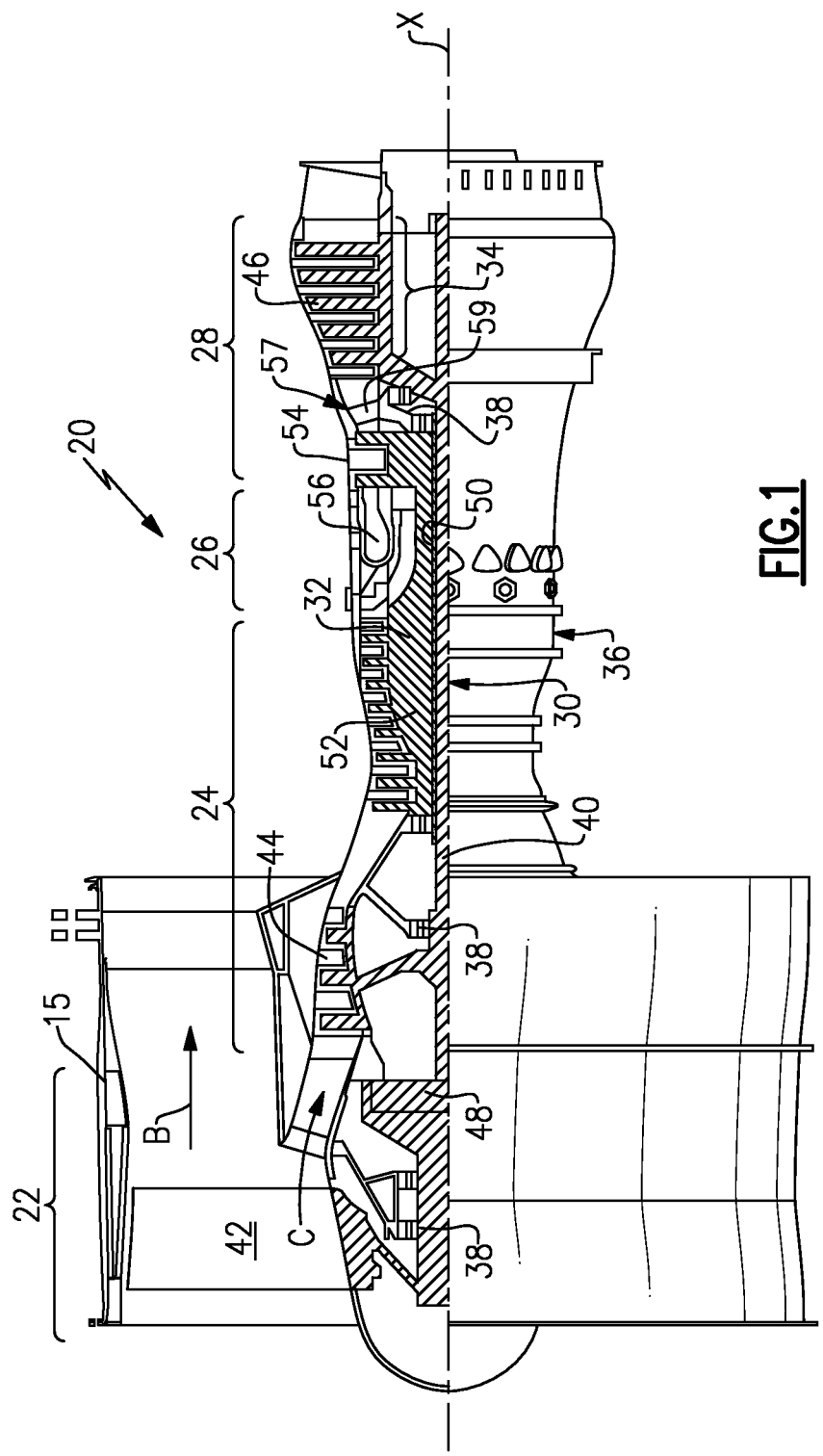
FIG. 1 schematically illustrates a gas turbine engine embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis X relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis X which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ ^\circ R)/(518.7^\circ R)]^{0.5}$. The "Low corrected fan tip speed" as disclosed herein according to one non-limiting embodiment is less than about 1150 ft/second (350.5 meters/second).

Figure 2A:
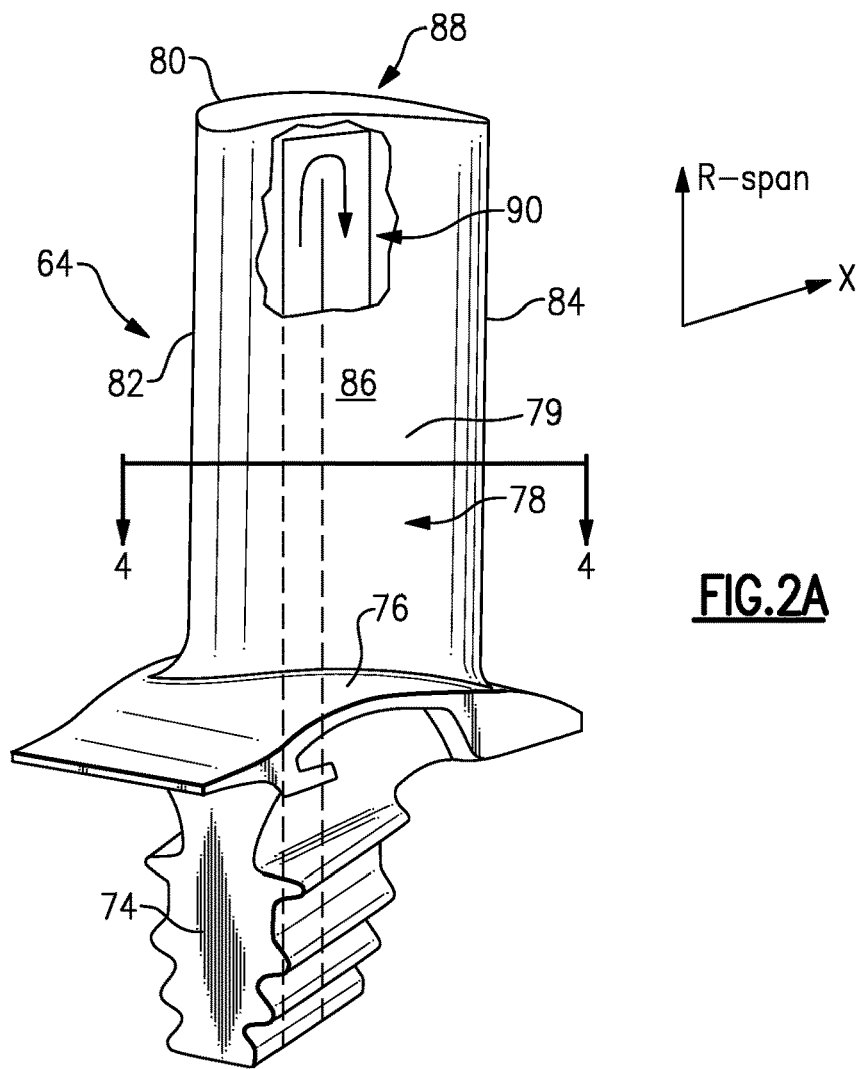
FIG. 2A is a perspective view of an airfoil having the disclosed film cooling hole arrangement.

Referring to FIG. 2A, a serpentine cooling passage 90 may be used in various gas turbine engine components. This passage or another passage may be used to feed cooling fluid to film cooling holes that extend to the exterior airfoil surface. For exemplary purposes, a turbine blade 64 is described. It should be understood that the film cooling hole configuration may also be used for other gas turbine engine components, such as in vanes, blade outer air seals, combustors, and turbine platforms, for example.

Figure 2B:
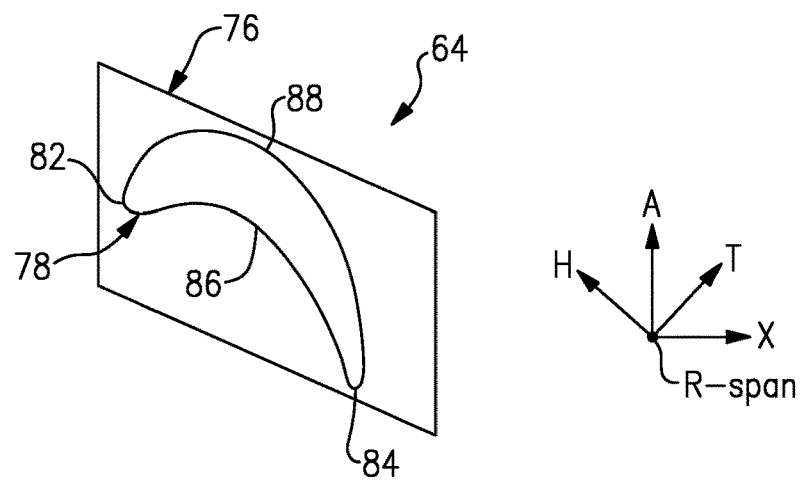
FIG. 2B is a plan view of the airfoil illustrating directional references.

Referring to FIGS. 2A and 2B, a root 74 of each turbine blade 64 is mounted to the rotor disk. The turbine blade 64 includes a platform 76, which provides the inner flow path, supported by the root 74. An airfoil 78 extends in a radial direction R from the platform 76 to a tip 80. It should be understood that the turbine blades may be integrally formed with the rotor such that the roots are eliminated. In such a configuration, the platform is provided by the outer diameter of the rotor. The airfoil 78 provides leading and trailing edges 82, 84. The tip 80 is arranged adjacent to a blade outer air seal (not shown).

The airfoil 78 of FIG. 2B somewhat schematically illustrates exterior airfoil surface 79 extending in a chord-wise direction H from a leading edge 82 to a trailing edge 84. The airfoil 78 is provided between pressure (typically concave) and suction (typically convex) wall 86, 88 in an airfoil thickness direction T, which is generally perpendicular to the chord-wise direction H. Multiple turbine blades 64 are arranged circumferentially in a circumferential direction A. The airfoil 78 extends from the platform 76 in the radial direction R, or spanwise, to the tip 80.

The cooling passage 90 is provided between the pressure and suction walls 86, 88. The exterior airfoil surface may include multiple film cooling holes 92 in fluid communication with the cooling passage 90, best shown in FIGS. 3-5.

FIG. 3 is a cross-sectional view through a wall 94 of a gas turbine engine component, such as the turbine blade shown in FIGS. 2A-2B. The wall 94 provides the exterior surface 79 and an interior flow path surface 124 facing the cooling passage 90. The wall 94 has a wall thickness 104 that surrounds a protrusion 106. The protrusion 106 is arranged extends a height 108 beyond the wall thickness 104 and provides a portion of the interior flow path surface 124.

A film cooling hole 92 has an inlet 100 provided on the protrusion 106 and extends to an exit 102 on the exterior surface 79. In one example, the film cooling hole 92 is provide by a metering hole 96 feeding cooling fluid F from the passage 90 to a diffuser 98 arranged at the exterior surface 79.

The metering hole 96 has a hydraulic diameter 110, or diameter, that extends a length 112 from the inlet 100 to the diffuser 98. In one example, the shape of the diameter 110 is circular. In the example of a circular diameter, a range of the diameter corresponds to 0.010-0.270 inch (0.25-6.86 mm).

In one example, the length 112 is in a range of 1.8-3.5 times the diameter 110. The height 108 is in a range of 1.1-20 times the diameter 110.

As best shown in FIG. 5, the protrusion 106 has a width 114 that is normal to a direction of the cooling fluid flow F. The film cooling hole 92 has a centerline 116 that is generally centered with respect to the width 114. The centerline 116 is generally in the same direction as a longitudinal direction L of the cooling passage 90, which encourages fluid to flow directly into the inlet 100.

The protrusion 106 may have any suitable contour. In the example, the protrusion 106 has first and second tapered surfaces 118, 120 that join at a curved peak 122. The inlet 100 is provided on the face of the first tapered surface 118.

Providing the inlet 100 of the film cooling hole 92 on the protrusion 106 minimizes flow losses from the off-taking of cooling fluid F in the cooling passage 90. Aligning the centerline 116 with the longitudinal direction L of fluid flow promotes higher film effectiveness into the film cooling hole 92. A high-pressure accumulation of fluid within the film cooling hole 92 is provided. The fluid within the metering hole 96 is configured to provide desired fluid flow into the diffuser 98. The protrusion 106 also increases convective heat transfer by providing more surface area within the cooling passage as well as promoting a turbulent boundary layer along the wall of the cooling passage 90. The longer metering length afforded by the additional material provided by the protrusion 106 settles the flow within the metering hole 96, which enable better flow distribution to the diffuser 98.

Figure 6:
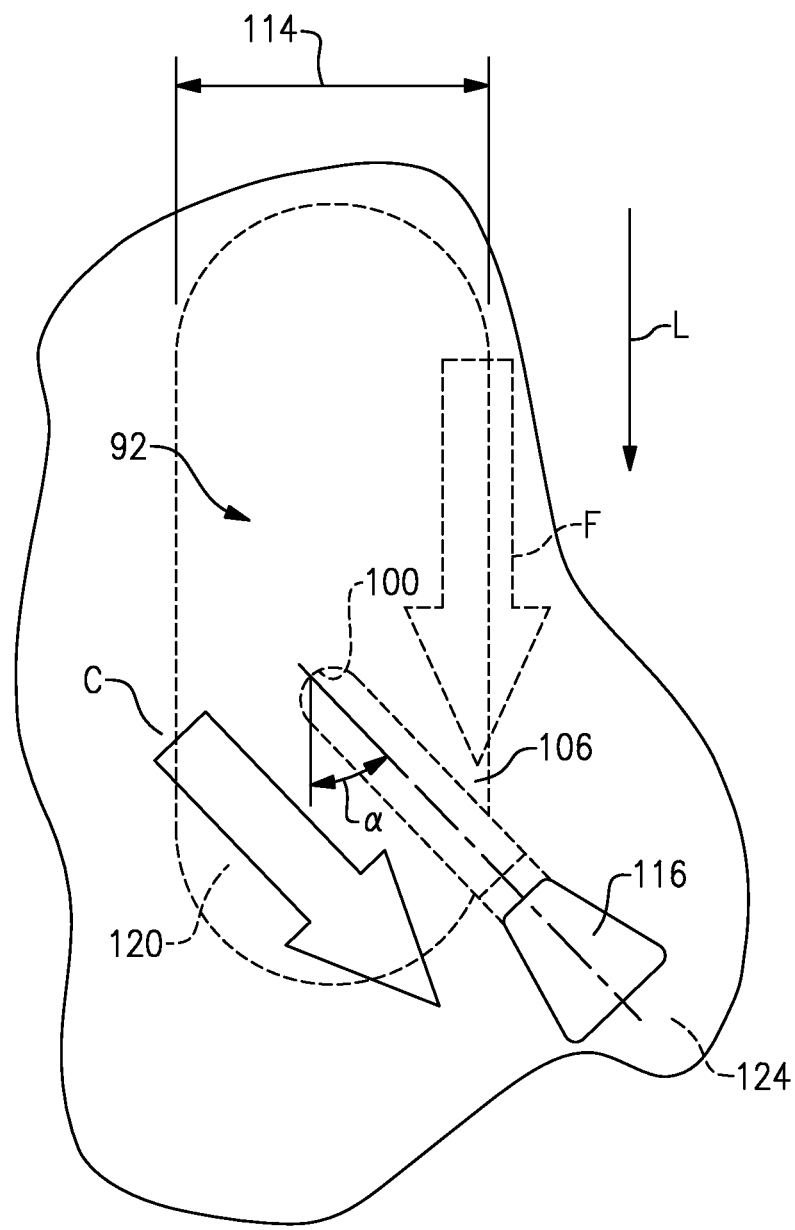
FIG. 6 is another plan view of an exterior surface of the gas turbine engine component.

In another example, the exterior flow direction C does not coincide with the longitudinal flow direction L of the interior cooling fluid flow F. In order to preserve film effectiveness, the film hole centerline is angled from longitudinal direction L by angle α as to match the flow direction of the exterior surface. The cooling hole inlet 100 is still centered on the face of the interior protrusion 106, as best shown in FIG. 6. The protrusion 100 may also be angle relative to the cooling fluid flow F to provide a portion of the total pressure to the film cooling hole. The location of the inlet may be on the second tapered surface Y, as shown.

The protrusion 106 and film cooling hole 92 may be formed using by conventional casting technologies. In some cases, an additive manufacturing process may be used.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A gas turbine engine component comprising:
   a wall extending in a radial direction and providing an exterior surface and an interior flow path surface, the wall having a wall thickness, wherein the wall provides a cooling passage extending in a longitudinal direction, the longitudinal direction being aligned with the radial direction;
   a protrusion arranged on the wall and extending a height beyond the wall thickness and providing a portion of the interior flow path surface; and
   a film cooling hole having an inlet provided on the protrusion and extending to an exit on the exterior surface, wherein the protrusion includes a first tapered surface configured to face into a cooling passage flow direction that corresponds to the longitudinal direction, the inlet is arranged on the first tapered surface, and the longitudinal direction corresponds to a length of the cooling passage that is greater than a width and height of the cooling passage.

2. The gas turbine engine component according to claim 1, wherein the gas turbine engine component is a turbine blade, and the exterior surface is an exterior airfoil surface.

3. The gas turbine engine component according to claim 1, the film cooling hole aligned with the longitudinal direction.

4. The gas turbine engine component according to claim 1, wherein the film cooling holes includes a metering hole providing the inlet and a diffuser providing the exit arranged downstream from the metering hole.

5. The gas turbine engine component according to claim 4, wherein the metering hole defines a diameter, and the height is in a range of 1.1-20 times the diameter.

6. The gas turbine engine component according to claim 5, wherein the metering hole extends a length, the length in a range of 1.8-3.5 times the diameter.

7. The gas turbine engine component according to claim 4, wherein the metering hole includes a diameter in the range of 0.010-0.270 inch (0.25-6.86 mm).

8. The gas turbine engine component according to claim 1, wherein the protrusion includes a second tapered surface joining the first tapered surface at a peak, the second tapered surface arranged on a downstream side of the protrusion.

9. The gas turbine engine component according to claim 1, wherein a centerline of the film cooling hole is angled from the longitudinal direction by an angle less than 90 degrees and aligned with a flow direction of the exterior surface.

10. The gas turbine engine component according to claim 1, wherein the protrusion has an upstream side and a downstream side relative to the cooling passage flow direction, and the upstream side includes the first tapered surface.

11. A gas turbine engine comprising:
a compressor section;
a turbine section; and
a component arranged in one of the compressor and turbine sections, the component including:
a wall providing an exterior surface and an interior flow path surface, the wall having a wall thickness, wherein the wall provides a cooling passage extending in a longitudinal direction;
a protrusion arranged on the wall and extending a height beyond the wall thickness and providing a portion of the interior flow path surface; and
a film cooling hole having an inlet provided on the protrusion and extending to an exit on the exterior surface, wherein the protrusion includes a first tapered surface configured to face into a cooling passage flow direction that corresponds to the longitudinal direction, the inlet arranged on the first tapered surface, and the longitudinal direction corresponds to a length of the cooling passage that is greater than a width and height of the cooling passage.

12. The gas turbine engine according to claim 11, wherein the component is arranged in the turbine section.

13. The gas turbine engine according to claim 12, wherein the exterior surface is an exterior airfoil surface.

14. The gas turbine engine according to claim 11, the film cooling hole aligned with the longitudinal direction.

15. The gas turbine engine according to claim 11 wherein the film cooling holes includes a metering hole providing the inlet and a diffuser providing the exit arranged downstream from the metering hole.

16. The gas turbine engine according to claim 15, wherein the metering hole defines a diameter, and the height is in a range of 1.1-20 times the diameter.

17. The gas turbine engine according to claim 16, wherein the metering hole extends a length, the length in a range of 1.8-3.5 times the diameter.

18. The gas turbine engine according to claim 15, wherein the metering hole includes a diameter in the range of 0.010-0.270 inch (0.25-6.86 mm).

19. The gas turbine engine according to claim 11, wherein the protrusion includes a second tapered surface joining the first tapered surface at a peak, the second tapered surface arranged on a downstream side of the protrusion.

20. A gas turbine engine component comprising:
a wall providing an exterior surface and an interior flow path surface, the wall having a wall thickness, wherein the wall provides a cooling passage extending in a radial direction;
a protrusion arranged on the wall and extending a height beyond the wall thickness and providing a portion of the interior flow path surface; and
a film cooling hole having an inlet provided on the protrusion and extending to an exit on the exterior surface, wherein the protrusion includes a first tapered surface configured to face into a cooling passage flow direction that corresponds to a longitudinal direction of the cooling passage, the inlet is arranged on the first tapered surface, and the longitudinal direction corresponds to a length of the cooling passage that is greater than a width and height of the cooling passage.

\* \* \* \* \*